United States Patent
Arao

(10) Patent No.: US 7,659,947 B2
(45) Date of Patent: Feb. 9, 2010

(54) LIQUID CRYSTAL DISPLAY DEVICE HAVING GATE WIRING ON INTERLAYER INSULTING FILM WHICH IS OVER TRANSISTOR, AND LIGHT SHIELDING LAYER(S)

(75) Inventor: Tatsuya Arao, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

(21) Appl. No.: 10/376,158

(22) Filed: Feb. 28, 2003

(65) Prior Publication Data
US 2003/0169380 A1  Sep. 11, 2003

(30) Foreign Application Priority Data
Mar. 8, 2002  (JP)  ............................ 2002-064389

(51) Int. Cl.
G02F 1/136 (2006.01)
G02F 1/1343 (2006.01)
G02F 1/1333 (2006.01)

(52) U.S. Cl. ............................ 349/46; 349/44; 349/47; 349/111; 257/72

(58) Field of Classification Search ................ 349/44, 349/47, 111, 139, 46; 257/59, 72
See application file for complete search history.

(56) References Cited

U.S. PATENT DOCUMENTS

| 5,115,305 | A | * | 5/1992 | Baur et al. ................. 348/751 |
| 5,187,604 | A | * | 2/1993 | Taniguchi et al. ........... 349/152 |
| 5,428,469 | A | * | 6/1995 | Willett .......................... 349/9 |
| 5,500,750 | A |   | 3/1996 | Kanbe et al. ................. 359/58 |
| 5,594,568 | A | * | 1/1997 | Abileah et al. ............. 349/120 |
| 5,677,747 | A | * | 10/1997 | Ishikawa et al. ............. 349/76 |
| 5,825,449 | A | * | 10/1998 | Shin ........................... 349/148 |
| 5,835,177 | A | * | 11/1998 | Dohjo et al. ................ 349/147 |
| 6,088,070 | A | * | 7/2000 | Ohtani et al. ................. 349/38 |
| 6,232,142 | B1 |   | 5/2001 | Yasukawa |
| 6,275,275 | B1 | * | 8/2001 | Ha .............................. 349/42 |
| 6,300,989 | B1 |   | 10/2001 | Iijima .......................... 349/96 |

(Continued)

FOREIGN PATENT DOCUMENTS

JP  5-289082  11/1993

(Continued)

OTHER PUBLICATIONS

Scheffer and Nehring, "Twisted Nematic and Supertwisted Nematic Mode LCDs" in Liquid Crystals Applications and Uses, ed. Bahadur, pp. 231-251, (1990).*

(Continued)

*Primary Examiner*—Andrew Schechter
(74) *Attorney, Agent, or Firm*—Cook Alex Ltd.

(57) ABSTRACT

A liquid crystal layer is provided between a pair of substrates, one of the pair of substrates is provided with a pixel region including a TFT and a light shielding layer in which an opening portion is formed, a semiconductor layer composing the TFT is overlapped with the light shielding layer and formed along one side of the opening portion, and an alignment of a liquid crystal molecule is controlled such that light which transmits through the liquid crystal layer is incident as polarized light perpendicular to the one side of the opening portion. The liquid crystal layer is particularly made of more a TN mode liquid crystal.

15 Claims, 9 Drawing Sheets

U.S. PATENT DOCUMENTS

| | | | |
|---|---|---|---|
| 6,327,006 B1 * | 12/2001 | Sato et al. | 349/44 |
| 6,384,808 B2 | 5/2002 | Azami | |
| 6,433,841 B1 * | 8/2002 | Murade et al. | 349/43 |
| 6,506,636 B2 | 1/2003 | Yamazaki et al. | |
| 6,583,472 B1 | 6/2003 | Shibata et al. | |
| 6,594,064 B2 | 7/2003 | Hirabayashi | |
| 6,613,620 B2 | 9/2003 | Fujimoto et al. | |
| 6,657,260 B2 | 12/2003 | Yamazaki et al. | |
| 6,720,577 B2 | 4/2004 | Arao et al. | |
| 6,747,289 B2 | 6/2004 | Yamazaki et al. | |
| 6,789,910 B2 | 9/2004 | Kimura et al. | |
| 6,825,488 B2 | 11/2004 | Yamazaki et al. | |
| 6,833,313 B2 | 12/2004 | Hayakawa | |
| 6,900,460 B2 | 5/2005 | Yamazaki et al. | |
| 6,953,951 B2 | 10/2005 | Yamazaki et al. | |
| 7,151,015 B2 | 12/2006 | Suzawa et al. | |
| 2001/0017372 A1 | 8/2001 | Koyama | |
| 2001/0025959 A1 * | 10/2001 | Yamazaki et al. | 257/72 |
| 2001/0030322 A1 | 10/2001 | Yamazaki et al. | 257/59 |
| 2002/0051112 A1 | 5/2002 | Katsura | 349/153 |

FOREIGN PATENT DOCUMENTS

| | | |
|---|---|---|
| JP | 6-281923 | 10/1994 |
| JP | 11-95212 | 4/1999 |
| JP | 2001-305577 | 10/2001 |

OTHER PUBLICATIONS

Office Action re Korean application No. KR 10-2003-0014229, dated Sep. 23, 2009 (with English translation).

* cited by examiner

LIQUID CRYSTAL DISPLAY DEVICE HAVING GATE WIRING ON INTERLAYER INSULTING FILM WHICH IS OVER TRANSISTOR, AND LIGHT SHIELDING LAYER(S)

BACKGROUND OF THE INVENTION

1. Field of the invention

The present invention relates to a liquid crystal display device using a thin film transistor (hereinafter referred to as a TFT) as a switching element, and more particularly to a light shielding method of a TFT located in a pixel.

2. Description of the Related Art

In general, a liquid crystal display device includes a TFT array substrate in which TFTs are mounted, a counter substrate which is located opposite to the TFT array substrate, a liquid crystal layer interposed between the TFT array substrate and the counter substrate, a polarizing plate provided on the side of the TFT array substrate opposite to the liquid crystal layer, and a polarizing plate provided on the side of the counter substrate opposite to the liquid crystal layer.

According to the liquid crystal display device, when illumination light incident from the counter substrate side transmits through the liquid crystal layer, transmittance of the illumination light is changed along with a change in orientation of liquid crystal molecules in accordance with a signal from a pixel electrode so that light having an intensity necessary to display an objective image is emitted.

When the illumination light incident into the liquid crystal display device enters into the channel formation region of a TFT, the conductivity is increased by a photoelectric effect so that it becomes a leak current (this is called a light leak current), thereby causing malfunction of the TFT In general, in order to prevent from light entering into the channel formation region, in an active matrix liquid crystal display device, a light shielding layer made of a metal material such as Cr (chromium) or Al (aluminum), a resin material, or the like is formed on the side of the counter substrate opposite to the TFT array substrate.

Most of light which transmits through the liquid crystal layer is prevented from entering into the channel formation region by the light shielding layer provided on the counter substrate side or the TFT array substrate side. However, a portion of transmitting light becomes reflection light (return light), which is reflected on an interface and the like of the TFT array substrate and enters into the TFT array substrate again so that it is incident into the channel formation region to cause a light leak current. When the amount of charges in a storage capacitor or the like is changed according to the light leak current so that an applying voltage to a pixel electrode is changed, light transmittance in liquid crystal is changed therewith. Thus, there is a problem in that a contrast ratio is reduced or color heterogeneity of a display image and improper display are caused. In particular, in halftone display, a region in which a change in light transmittance is significantly affected by a change in applying voltage is used. Thus, failure of display resulting from the light leak current in the TFT is more visible.

SUMMARY OF THE INVENTION

In order to solve the above problem, an object of the present invention is to reduce the amount of reflection light wrapping around a channel formation region in half tone display in particular, thereby reducing the risk of failure of display resulting from a light leak current.

According to a liquid crystal display device of the present invention, a liquid crystal layer is provided between a pair of substrates, one of the pair of substrates is provided with a pixel region including a TFT and a light shielding layer in which an opening portion is formed, a semiconductor layer composing the TFT is overlapped with the light shielding layer and formed along one side of the opening portion, and an alignment of a liquid crystal molecule is controlled such that light which transmits through the liquid crystal layer is incident as p-polarized light with respect to the one side of the opening portion in which the semiconductor layer is provided in halftone display. The liquid crystal layer is preferably made of a TN mode liquid crystal.

Also, according to another structure of the present invention, a TN mode liquid crystal layer is provided between a pair of substrates, one of the pair of substrates is a TFT array substrate in which a plurality of TFTs are arranged and provided with a pixel region including the plurality of TFTs and a light shielding layer in which an opening portion is formed, a semiconductor layer composing each of the plurality of TFTs is overlapped with the light shielding layer and formed in only a region along one side of the opening portion, and an alignment of a liquid crystal molecule is controlled such that light entering into the TFT array substrate is incident as p-polarized light with respect to the one side of the opening portion in which the semiconductor layer is provided in halftone display.

FIG. 1 shows a relationship between an incident angle and reflectance of light incident into glass. As shown in FIG. 1, generally, the reflectance of light (p-polarized light) oscillated in a plane including incident light and a normal with respect to an entrance surface is smaller than that of light (s-polarized light) oscillated in a plane perpendicular to the plane including incident light and a normal with respect to an entrance surface. FIG. 2 shows reflectance and transmittance of light incident into an interface between a substrate containing mainly a silicon oxide and a vacuum. As shown in FIG. 2, even in light reflected on the substrate containing mainly a silicon oxide with a refractive index n=1.46, similarly, the reflectance of p-polarized light is smaller than that of s-polarized light.

Therefore, when reflection light incident into the TFT is light including mainly p-polarized light, the amount of reflection light can be suppressed as compared with light including mainly s-polarized light. As a result, light incident into the TFT can be reduced.

As described above, according to the liquid crystal display device of the present invention, in halftone display, light which transmits through the liquid crystal layer and then is incident into the TFT array substrate is converted into linearly polarized light in a row direction (or column direction) and pixel TFTs are arranged in a traveling direction of light components which travel in the row direction (or column direction). Thus, light incident into a reflection surface of the TFT array substrate is converted into light including mainly p-polarized light to minimize the amount of reflection light.

DETAILED DESCRIPTION OF THE PREFERRED EMBODIMENTS

An embodiment mode of the present invention will be described using FIGS. 4 and 5.

Figure 4:
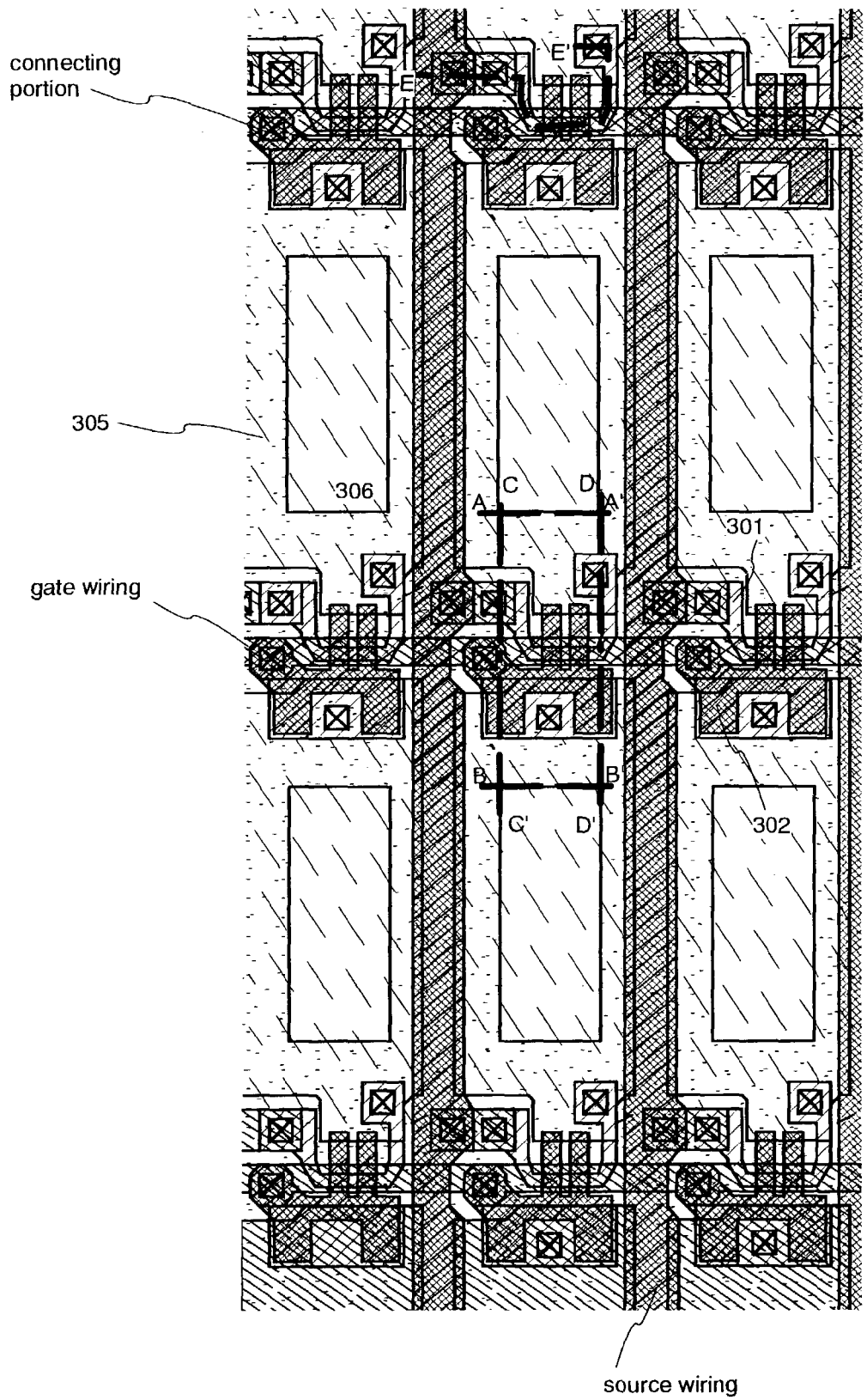
FIG. 4 is a top view obtained by enlarging a portion of a pixel portion of a liquid crystal display device.

FIG. 4 is a top view obtained by enlarging a portion of a pixel portion in a liquid crystal display device. In FIG. 4, with respect to each of pixel TFTs, a semiconductor layer 301 is assumed as an active layer, and a region in which a gate electrode 302 and the semiconductor layer 301 are overlapped with each other is assumed as a channel formation region.

In the liquid crystal display device of the present invention, as shown in FIG. 4, the channel formation region of a pixel TFT is provided in one of regions connected in a row direction in a light shielding layer 305 in which a plurality of opening portions are formed in matrix and under a region (region surrounded by lines A-A', B-B', C-C', and D-D') except a cross portion with one of regions connected in a column direction.

Shapes in the semiconductor layer 301, a pixel electrode 306, and the gate electrode 302 may be different from those shown in FIG. 4.

Figure 5:
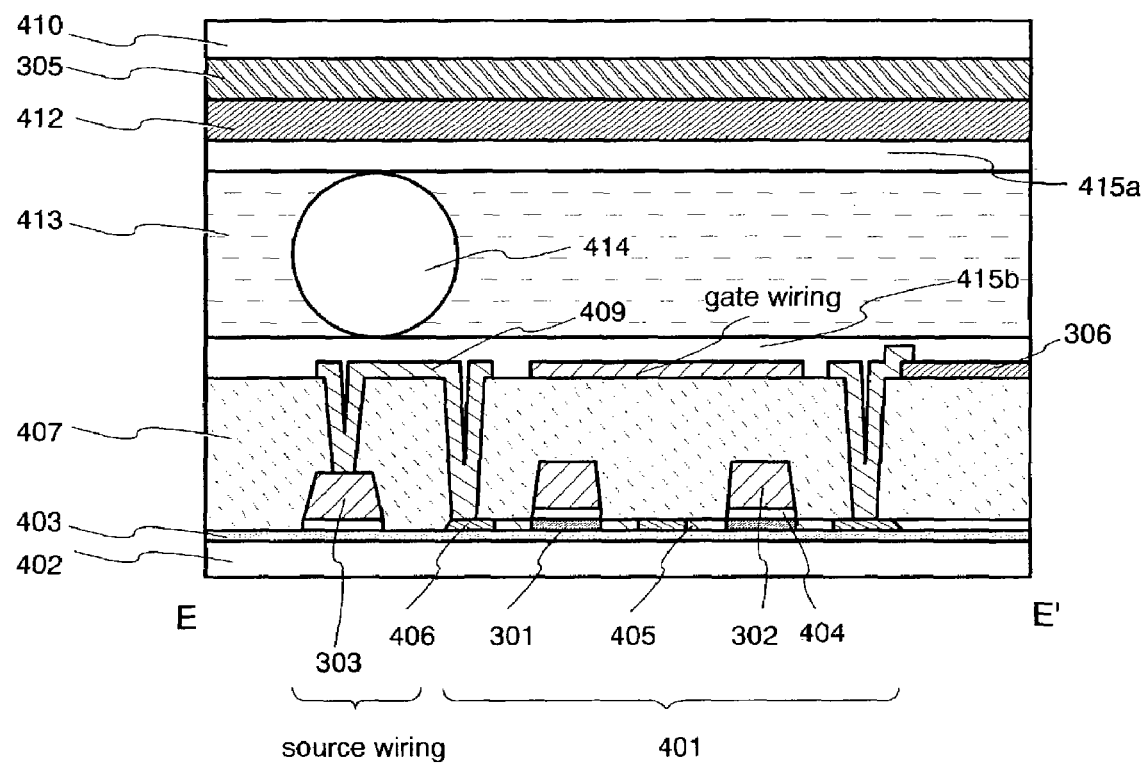
FIG. 5 is a sectional view of a portion of the liquid crystal display device.

FIG. 5 is a cross sectional view along a line E-E' in FIG. 4. In FIG. 5, rubbing treatment is conducted for an alignment film 415b such that liquid crystal molecules in the liquid crystal layer which are closest to the TFT array substrate are aligned at 45° to a column direction to convert light incident into the TFT array substrate in which the pixel TFTs are arranged as shown in FIG. 4 into polarized light in a column direction in halftone display. Thus, when a polarization direction of light incident into the TFT array substrate is controlled, a column direction light component of light reflected on an interface with the TFT array substrate can be converted into a light component of p-polarized light.

In FIG. 5, a pixel TFT 401 is a top gate type. However, if a channel portion is provided in one of the regions connected in the row direction in the light shielding layer 305 and under the region (region surrounded by lines A-A', B-B', C-C', and D-D') except a cross portion with one of the regions connected in the column direction as shown in FIG. 4, a bottom gate type may be used.

A method of manufacturing a liquid crystal display device as shown in FIG. 5 will be described below.

A base film 403 for preventing an impurity diffusion from a substrate 402 to the semiconductor layer 301 is formed on the substrate 402 having a preferable light transmission property and an insulating property. A silicon oxide film, a silicon nitride film, or the like which has a preferable light transmission property and an insulating property is used as the base film 403. In addition, it is not necessarily made to a single layer and thus may be used as a multi-film of two or more layers.

A pixel TFT 401, an N-channel TFT (not shown) for signal driver circuit, and a P-channel TFT (not shown) for signal driver circuit are produced on the base film 403 as follows.

An amorphous silicon film is formed on the base film 403 and crystallized by using a solid phase growth method or a laser crystallization method to form a crystalline silicon film. The crystalline silicon film is patterned to form the semiconductor layer 301 having a desirable shape. In the formation of the amorphous silicon film or after the crystallization thereof, an impurity for controlling a threshold value is added to the semiconductor layer 301.

A silicon oxide film which becomes a gate insulating film 404 is formed on the semiconductor film 301 and further a conductive film which becomes a gate electrode 302 is formed thereon. In addition to the silicon oxide film, a film having an insulating property such as a silicon nitride film is used as the insulating film. A metallic material such as tungsten or molybdenum, a metallic compound such as tantalum nitride, a silicon film to which an impurity is added to lower a resistivity, or the like is used for the conductive film. In addition, the gate insulating film 404 is not necessarily made to a single layer and thus may be made to a multi-layer structure in which other metallic materials, other metallic compounds, other silicon films, or the like are laminated. The gate insulating film 404 and the gate electrode 302 are formed in a desirable shape by patterning.

Next, an impurity is added to the semiconductor layer 301 by doping to form LDD regions 405 having a low impurity concentration and source (and drain) regions 406 having a high impurity concentration. The LDD regions 405 are formed to obtain a desirable off leak current. When the desirable off leak current is obtained even in the case where the regions do not exist, they may not be formed. In addition, in a TFT of a signal drive circuit portion, in order to obtain desirable reliability, a low concentration impurity region in which a gate electrode and an LDD portion are overlapped with each other may be formed.

By the above process, the pixel TFT 401, the N-channel TFT, and the P-channel TFT are produced on the same substrate.

Next, an interlayer insulating film 407 is formed. An inorganic material such as a silicon oxide film having a preferable light transmission property and an insulating property or an organic material such as an acrylic having a preferable light transmission property and an insulating property is used for the interlayer insulating film 407. The interlayer insulating film 407 is not necessarily made to a single layer and thus may be made to a multi-layer structure in which an inorganic material or an organic material having a preferable light transmission property and an insulating property are laminated. In addition, heat treatment is conducted for the interlayer insulating film 407 in a nitrogen atmosphere or a hydrogen atmosphere before or after the formation thereof to conduct activation of the doped impurity and hydrogenation for terminating dangling bonds which exist in an interface between the semiconductor layer 301 and the gate insulating film 404. When the interlayer insulating film 407 is made to a multi-layer structure, heat treatment may be conducted during lamination.

A contact hole is formed in the interlayer insulating film 407 and then a pixel electrode 306 is formed, and further a wiring 409 for transferring signals to the TFT and the pixel electrode 306 is formed. ITO as a conductive metal compound is used for the pixel electrode. The hydrogenation may be conducted after the formation of the wiring 409. In addition, a structure obtained by the following process may be used. That is, after the wiring is formed, an interlayer insulating film is formed, a pixel electrode is formed, and a contact between the pixel electrode and the wiring is made through a contact hole.

After the TFT array substrate is manufactured by the above process, the counter substrate is manufactured as follows.

A metallic chromium film is formed on a substrate 410 having a preferable light transmission property and an insulating property and patterned to form a light shielding layer 305 having a desirable shape. In addition to a metallic material such as metallic chromium, a resin material which does not transmit light, or the like may be used as the light shielding layer.

An ITO film as a transparent conductive film is formed on the light shielding layer 305 to form a counter electrode 412.

Although not shown in FIG. 5, a color filter and the like may be provided between the light shielding layer 305 and the counter electrode 412. Through the above process, the counter substrate is manufactured.

Figure 11A:
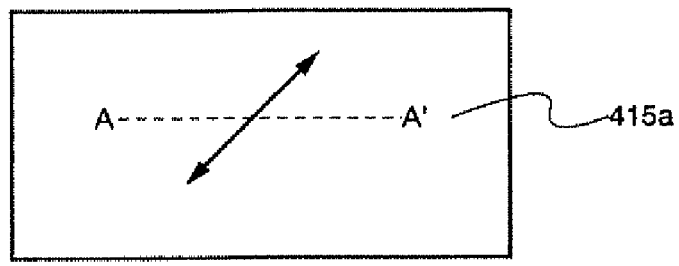
FIGS. 11A to 11C are schematic views showing rubbing treatment directions.
Figure 11B:
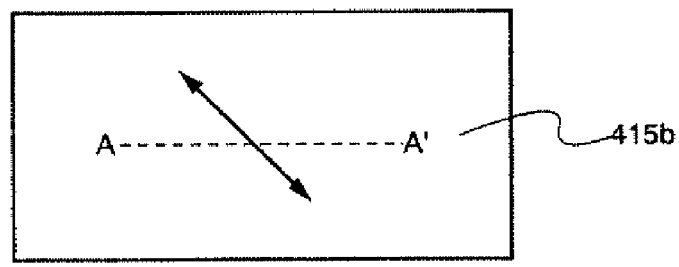
Figure 11C:
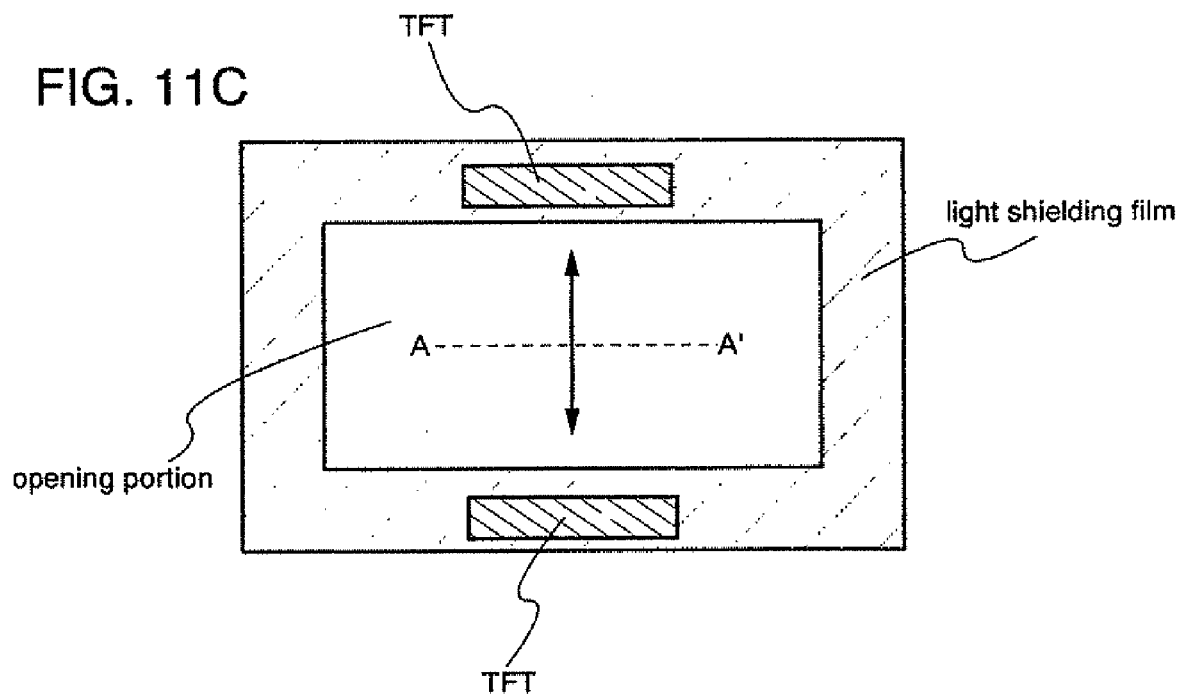

Next, alignment films 415a and 415b made of a polyimide resin are formed on the TFT array substrate and the counter substrate, respectively. In addition to the polyimide resin, a polyamic system resin may be used. Rubbing treatment is conducted such that liquid crystal molecules have a constant pretilt angle and a constant twist angle. In this embodiment mode, rubbing treatment is conducted for the alignment film 415a formed on the TFT array substrate and the alignment film 415b formed on the counter substrate in a direction with about 45° relative to a longitudinal direction (A-A') of the respective substrates as shown in FIGS. 11A and 11B. Note that a treatment direction of the alignment film 415a is different from that of the alignment film 415b by about 90°. Further, when the liquid crystal molecules are made to have a left-hand twisted direction between the alignment films 415a and 415b, at a voltage in which a change in voltage applied to a liquid crystal layer becomes maximum, as shown in FIG. 11C, control can be conducted such that light transmitted through the liquid crystal layer becomes polarized light perpendicular to the direction A-A'. Light incident into the TFT becomes light including mainly p-polarized light.

A sealing agent is applied to the counter substrate. After that, the counter substrate is heated in an oven for provisional curing, and then spacers of plastic spheres are sprayed.

The TFT array substrate and the counter substrate are bonded to each other with high precision to manufacture a liquid crystal panel. Fillers (not shown) are mixed into the sealing agent. Thus, both substrates can be bonded to each other at a constant interval by the fillers and the spacers. An unnecessary portion of the bonded substrates is sheared to obtain a liquid crystal panel having a desirable size. A liquid crystal material 413 is injected into the inner portion of the liquid crystal panel to fill the entire panel, and then the panel is completely sealed with a sealing agent.

An FPC, polarizing plates, and phase differential plates are attached to the liquid crystal panel manufactured by the above process to obtain a liquid crystal display device. Note that the liquid crystal display device of this embodiment mode is a TN type liquid crystal display device.

Embodiment 1

In this embodiment, a method of manufacturing a TN type liquid crystal display device will be described.

First, a method of manufacturing a TFT array substrate as one of structural elements of the liquid crystal display device will be described. Note that the TFT array substrate manufactured in this embodiment is designed such that a pixel TFT is provided under a light shielding layer adjacent to an opening portion in a column direction.

Figure 6:
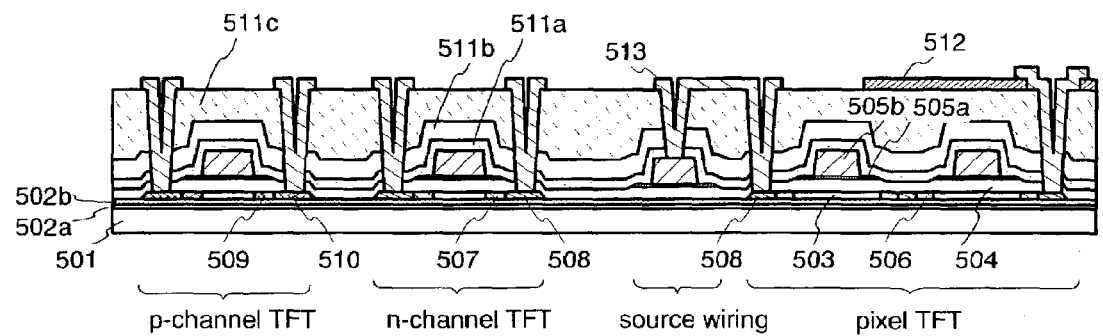
FIG. 6 is a sectional view of TFTs formed on a TFT array substrate.

In FIG. 6, a substrate 501 for TFT formation is prepared. A substrate having an insulating surface such as a glass substrate or a quartz substrate is used as the substrate 501. In addition, a substrate containing mainly silicon, a metallic substrate, or a stainless substrate on the surface of which an insulating film is formed may be used.

A base insulating film 502 (502a and 502b) for preventing impurity diffusion from the substrate is formed on the substrate 501. A film having an insulating property such as a silicon oxide film or a silicon nitride film is used as the base insulating film 502. Here, an example in which the film having a two-layer structure (502a and 502b) is used as the base insulating film 502 is described. However, a single layer film or a film in which two or more layers are laminated may be used as the insulating film. In addition, if the impurity diffusion does not cause a problem, the base insulating film 502 may be not used.

A semiconductor layer 503 is formed on the base insulating film 502. An amorphous silicon film is formed, and then a crystalline silicon film obtained by crystallizing the amorphous silicon film is formed in a desirable shape by photolithography and etching to obtain the semiconductor layer 503. A thickness of the semiconductor layer 503 is 45 nm to 60 nm. If necessary, it may be set to 45 nm or less or 60 nm or more. In addition to the amorphous silicon film, an amorphous silicon germanium film may be formed. The crystallization is conducted using a known solid phase growth method or a known laser crystallization method.

An impurity for controlling a threshold voltage of an element is added to the semiconductor layer 503. Phosphorus, boron, or the like is used as the impurity. The addition of the impurity is conducted by doping after the formation of the amorphous silicon film, after the crystallization of the amorphous silicon film, or after the formation of the semiconductor layer 503. In addition, an amorphous silicon film to which the impurity is added may be used in film formation.

A gate insulating film 504 is formed on the semiconductor layer 503. The gate insulating film 504 is made from a silicon oxide film having a thickness of 100 nm to 120 nm. A thickness of the gate insulating film 504 may be set to 100 nm or less or 120 nm or more, if necessary. In addition to the silicon oxide film, an insulating film such as a silicon nitride film may be formed.

Each gate electrode 505 (505a and 505b) is formed on the gate insulating film 504. More specifically, a conductive film 505a having a thickness of 20 nm to 100 nm and a conductive film 505b having a thickness of 100 nm to 400 nm are laminated on the gate insulating film 504 and then the gate electrode 505 having a desirable shape is formed by photolithography and etching. In this embodiment, TaN is used for the conductive film 505a and W is used for the conductive film 505b. A material used for forming the gate electrode 505 is not limited to tantalum nitride or tungsten as described above. Thus, an element selected from the group consisting of Ta, W, Ti, Mo, Al, Cu, Cr and Nd, an alloy film or a compound material in which the elements are combined, or a semiconductor film represented by a polycrystalline silicon film to which an impurity element such as phosphorus is added may be used for the gate electrode. In addition, in this embodiment, a laminate film of two layers is used. However, a single layer film or a laminate structure of two or more layers may be used. In this embodiment, the gate electrode 505 of a hat shape in which two layers having a trapezoid sectional shape are laminated and a bottom side of the upper layer and a top side of the lower layer are substantially the same length is formed by taper etching and anisotropic etching using an etching gas containing a $CF_4$ gas. If it can be formed in a desirable shape, a gas other than the $CF_4$ gas may be used for the taper etching and the anisotropic etching. In addition, a gate electrode having a shape other than the hat shape may be used.

$N^{--}$ regions 506 are formed. The $n^{--}$ regions 506 are formed by doping the entire surface of the semiconductor layer with phosphorus. In this embodiment, phosphorus is used. However, if it is an n-type impurity element, As or the like may be used. In addition to the doping, a method such as ion implantation may be used.

$N^-$ regions 507 and $n^+$ regions 508 are formed. More specifically, a resist mask is formed so as not to add an n-type impurity to regions except the $n^-$ regions 507 and the $n^+$ regions 508, and then phosphorus is doped to form the $n^{31}$ regions and the $n^+$ regions. The $n^-$ regions 507 are doped with phosphorus through the gate electrode 505a. In addition, the $n^-$ regions are doped through the insulating film left on the semiconductor layer 503. In this embodiment, doping for forming the $n^-$ regions 507 and doping for forming the $n^+$ regions 508 are simultaneously conducted. However, a doping condition may be changed for the $n^-$ region formation and the $n^+$ region formation. In addition, an n-type impurity such as As may be used instead of phosphorus. A method other than doping such as ion implantation may be used as the adding method.

$P^-$ regions 509 and $p^+$ regions 510 are formed. More specifically, a resist mask is formed so as not to add a p-type impurity to regions except the $p^-$ regions 509 and the $p^+$ regions 510, and then boron is doped to form the $p^-$ regions and the $p^+$ regions. The $p^-$ regions 509 are doped with boron through the gate electrode 505a. In addition, the $p^-$ regions are doped through the insulating film left on the semiconductor layer 503. In this embodiment, doping for forming the $p^-$ regions 509 and doping for forming the $p^+$ regions 510 are simultaneously conducted. However, a doping condition may be changed for the formation of $p^-$ regions 509 and the formation of $p^+$ regions 510. In addition, a method other than doping such as ion implantation may be used as the adding method.

An interlayer insulating film 511 (511a, 511b, and 511c) is formed. The interlayer insulating film 511 is composed of a first interlayer insulating film 511a and a second interlayer insulating film 511b which are an inorganic film and a third interlayer insulating film 511c which is an organic film.

A silicon oxide film having a thickness of 50 nm to 100 nm is used as the first interlayer insulating film 511a. After the formation of the first interlayer insulating film 511a, the impurity added to the semiconductor layer is activated by heating. The activation is conducted by using a furnace in a nitrogen gas atmosphere at 550° C. for 1 hour to 12 hours. In this embodiment, the activation is conducted using the furnace. However, it may be conducted using a lamp for RTA or a laser. Conditions of an atmosphere, a temperature, and a time in the activation are not limited to the above conditions. When the activation is conducted for an atmosphere in which the gate electrode 505 is not oxidized, for example, when the activation using a furnace or a lamp for RTA is conducted in a low oxygen atmosphere, the interlayer insulating film 511a may not be formed. Further, when the activation is conducted using a laser, the interlayer insulating film 511a may not be formed. Further, a material other than the silicon oxide film may be used as long as it is resistant to an activation temperature, can prevent the oxidation of the gate electrode 505 during the activation, and has a preferable light transmission property.

A silicon nitride film having a thickness of 50 nm to 100 nm is used as the second interlayer insulating film 511b. After the formation of the second interlayer insulating film 511b, heat treatment is conducted in a nitrogen atmosphere at 350° C. to 420° C. for 1 hour. In this embodiment, the heat treatment is conducted in a nitrogen atmosphere. However, the heat treatment may be conducted in a 3% to 100% hydrogen atmosphere. In addition, the heat treatment time is not limited to 1 hour. If the heat treatment is conducted in a 3% to 100% hydrogen atmosphere for 1 hour after the activation treatment which is conducted after the formation of first interlayer insulating film 511a, the above heat treatment after the formation of the second interlayer insulating film 511b may not be conducted.

An acrylic having a thickness of 0.6 μm to 1.6 μm is used as the third interlayer insulating film 511c. In addition to an acrylic, a material having an insulating property such as a polyimide may be used. In addition, an inorganic film having an insulating property may be used. A thickness of the inorganic film is changed according to a dielectric constant of the inorganic film. However, it is generally 1.0 μm to 1.3 μm.

A pixel electrode 512 is formed on the third interlayer insulating film 511c. The pixel electrode 512 is formed by forming an ITO (indium tin oxide) film and then conducting photolithography and etching therefor. If it is a transparent conductive film, a tin oxide ($SnO_2$) or the like may be used in addition to the ITO.

After the formation of the pixel electrode 512, contact holes for connecting the high impurity concentration regions (508 and 510) with wirings 513 are formed by photolithography and etching.

After the formation of the contact holes, the wirings 513 are formed. More specifically, a first Ti film having a thickness of about 60 nm is formed, a TiN film having a thickness of about 40 nm is laminated thereon, an Al—Si (Al containing Si of 2 weight %) film having a thickness of 350 nm is laminated thereon, a second Ti film is formed thereon, and photolithography and etching are conducted for a resultant laminate film to form the wirings 513. The first Ti film prevents Al in the Al—Si film from diffusing into the semiconductor layer. The second Ti film prevents the generation of a hillock on the Al—Si film. In this embodiment, the TiN film is formed to improve an Al diffusion preventing effect. However, it may not be formed. In addition to the Al—Si film, another low resistance conductive film such as an Al—Ti (Al containing Ti) may be used.

In this embodiment, a region in which the pixel electrode 512 and the wiring 513 are laminated is provided so that the pixel electrode 512 and the wiring 513 are electrically connected with each other without forming a contact hole.

Through the above process, the TFT array substrate which has on the same substrate the driver circuit including the n-channel TFT of the GOLD structure and the p-channel TFT of the GOLD structure and the pixel portion including the pixel TFT, a storage capacitor, and the pixel electrode is manufactured.

Figure 7:
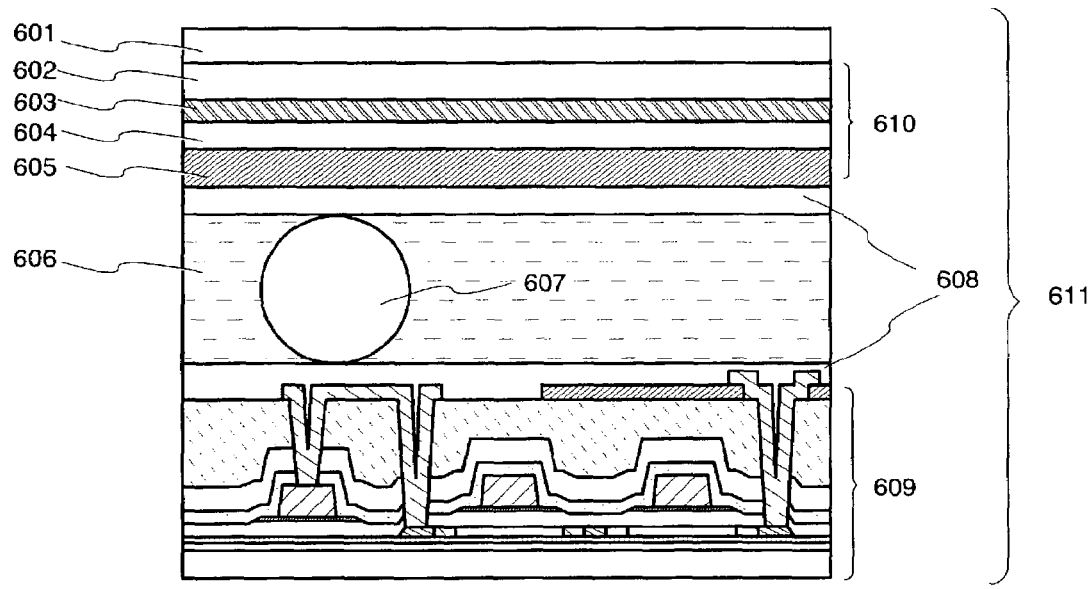
FIG. 7 is a sectional view of a portion of the liquid crystal display device.

Next, a method of manufacturing a counter substrate will be described. As shown in FIG. 7, a light shielding film 602 is formed on a substrate 601. The light shielding film 602 is formed by forming a metallic chromium film and conducting photolithography and etching therefor.

A counter electrode 605 is formed on the light shielding layer 602. The counter electrode 605 is formed by forming an ITO film as a transparent conductive film and conducting photolithography and etching therefor.

When a color filter 603 is provided between the light shielding film 602 and the counter electrode 605, a colored resin of a target color is applied onto the light shielding layer 602 by a spin coating method and then exposure and development are conducted. Such a color filter forming process is repeated for each of color filters (not shown) of three colors (red, blue, and green).

A protective film 604 for eliminating a step between the color filter 603 and the light shielding layer 602 for leveling is formed. The protective film 604 is formed by applying an acrylic onto the color filter. In addition to an acrylic, a material which is capable of leveling the step may be used. When the color filter is not provided, the protective film 604 may not be formed.

Through the above process, the counter substrate is manufactured.

After a TFT array substrate 609 and a counter substrate 610 are manufactured, a liquid crystal panel 611 is produced using these substrates in the following manner.

Alignment film 608 is formed in a TFT formation side of the TFT array substrate 609 and in a pixel electrode formation side of the counter substrate 610, respectively. An offset printing method is used for forming the alignment films 608. A polyimide resin is used as a material of the alignment films 608. In addition to this, a polyamic-based resin or the like may be used.

Rubbing treatment is conducted in an alignment film formation side of the TFT array substrate and that of the counter substrate to which the alignment films 608 are formed so that liquid crystal molecules are aligned at a constant pretilt angle. A rubbing angle is set such that the liquid crystal molecules have a twist angle of 90° and a director direction of liquid crystal molecules in the liquid crystal layer which are closest to the TFT array substrate crosses the line A-A' in FIG. 4 at 45°. In this embodiment, the twist angle is set to 90°. However, an angle other than this angle may be set to obtain a desirable contrast and the like. In addition, in order to convert light transmitted through the liquid crystal layer into linearly polarized light perpendicular to the line A-A' in FIG. 4 at a voltage in which a change in transmittance of light transmitting through the substrate becomes maximum with respect to a change in voltage applied to the liquid crystal layer, the director direction of the liquid crystal molecules must be changed if necessary. After the rubbing treatment, the TFT array substrate 609 and the counter substrate 610 are washed to remove contamination caused by the rubbing treatment and fallen wool of a rubbing cloth.

A sealing agent (not shown) is applied to the counter substrate, and then the counter substrate 610 is heated in an oven for provisional curing of the sealing agent. After the provisional curing, spacers 607 of plastic spheres are sprayed in the pixel electrode formation side of the counter substrate.

The TFT formation side of the TFT array substrate 609 and the counter electrode 605 formation side of the counter substrate 610 are opposed to each other and both substrates are bonded to each other with high precision to manufacture the liquid crystal panel 611. Fillers (not shown) are mixed into the sealing agent. Thus, both substrates can be bonded to each other at a constant interval by the fillers and the spacers.

An unnecessary portion of the bonded substrates is sheared to obtain the liquid crystal panel 611 substrate having a desirable size.

A liquid crystal material 606 is injected into the inner portion of the liquid crystal panel 611. After the entire inner portion of the panel is filled with the liquid crystal material 606, the panel is completely sealed with a sealing agent (not shown).

Figure 8:
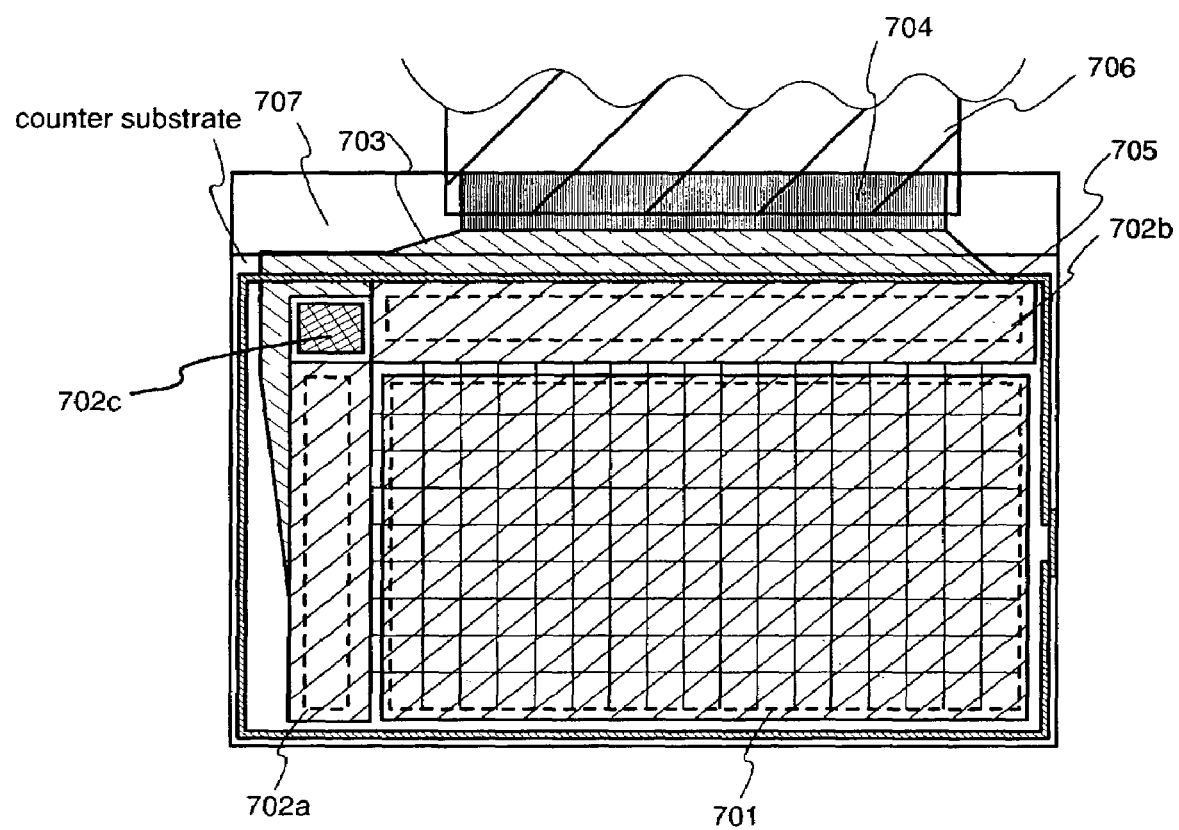
FIG. 8 is a top view of the entire liquid crystal display device.

FIG. 8 is a top view of the liquid crystal panel 611. A scan signal driver circuit 702a and an image signal driver circuit 702b are provided in the vicinity of a pixel portion 701. In addition to these, a signal processing circuit 702c including a CPU and a memory may be provided. The driver circuits are connected with an external input and output terminal group 704 through a connection wiring group 703.

In the pixel portion 701, gate wiring groups extended from the scan signal driver circuit 702a cross data wiring groups extended from the image signal driver circuit 702b in matrix to construct pixels. A pixel TFT, a storage capacitor, and a pixel electrode are provided for each of the pixels.

A sealing agent 705 is formed outside the pixel portion 701, the scan signal driver circuit 702a, the image signal driver circuit 702b, and the signal processing circuit 702c on a TFT array substrate 707 and in the inner portion of the external input and output terminal group 704, In the outside of the liquid crystal panel 611, a flexible printed circuit (FPC) 706 is connected with the external input and output terminal group 704 so that it is connected with the respective driver circuits through the connection wiring group 703. The external input and output terminal group 704 is made from the same conductive film as the data wiring group. The flexible printed circuit 706 is composed of an organic resin film made of a polyimide or the like to which copper wirings are formed, and connected with the external input and output terminal group 704 by an anisotropic conductive adhesive.

A polarizing plate and a phase differential plate are attached to the counter substrate of the liquid crystal panel 611 such that linearly polarized light in the same director direction as liquid crystal molecules in the liquid crystal layer which are closest to the counter substrate is incident thereinto. In addition, the polarizing plate, and the phase differential plate are attached to the TFT array substrate of the panel such that light in the same director direction as liquid crystal molecules in the liquid crystal layer which are closest to the TFT array substrate is outputted.

By the above method, the liquid crystal display device of the present invention is produced. Although not described in this embodiment, a washing step and heat treatment step are added if necessary.

Embodiment 2

In this embodiment, it is different from Embodiment 1, and a method of producing a liquid crystal display device in which a pixel TFT is provided under a light shielding layer adjacent to an opening portion in a row direction will be described. As a method of manufacturing a TFT array substrate and a counter substrate, the same method as in Embodiment 1 is used. Note that it is assumed that the liquid crystal display device in this embodiment is a TN type liquid crystal display device.

As in Embodiment 1, rubbing treatment is conducted in an alignment film formation side of the TFT array substrate and that of the counter substrate to which the alignment films 608 are formed so that liquid crystal molecules are aligned at a constant pretilt angle. A rubbing angle is set such that the liquid crystal molecules have a twist angle of 90° and a director direction of liquid crystal molecules in the liquid crystal layer which are closest to the TFT array substrate crosses the line C-C' in FIG. 4 at 45°. In this embodiment, the twist angle is set to 90°. However, an angle except this angle may be set to obtain a desirable contrast and the like. In addition, in order to convert light transmitted through the liquid crystal layer into linearly polarized light perpendicular to the line C-C' in FIG. 4 at a voltage in which a change in transmittance of light transmitting through the substrate becomes maximum with respect to a change in voltage applied to the liquid crystal layer, the director direction of the liquid crystal molecules must be changed if necessary.

After such rubbing treatment, the TFT array substrate and the counter substrate are bonded to each other by the same method as in Embodiment 1 to manufacture a liquid crystal panel. An FPC and the like are attached to the manufactured liquid crystal panel by the same method as in Embodiment 1 to produce a liquid crystal display device.

Embodiment 3

Figure 1:
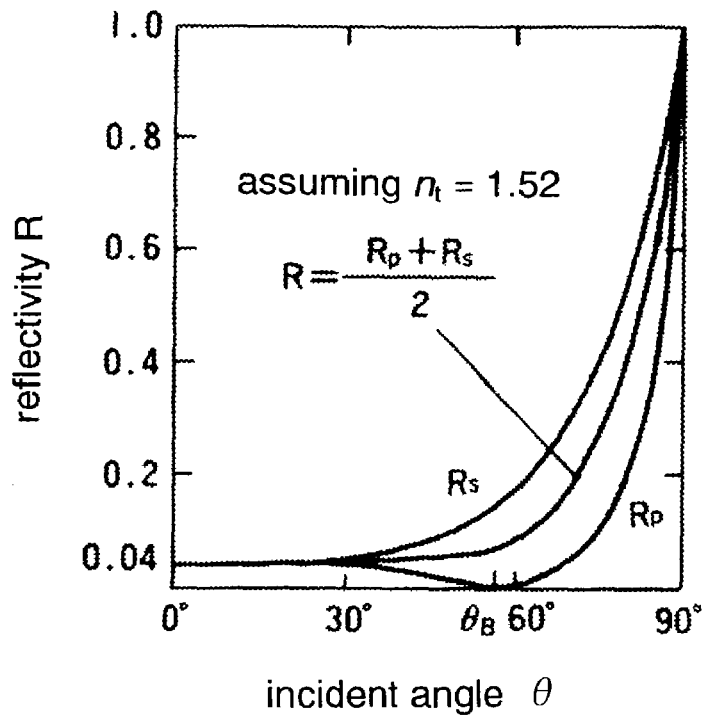
FIG. 1 shows a reflectance R of p-polarized light and that of s-polarized light to an incident angle θ.
Figure 2:
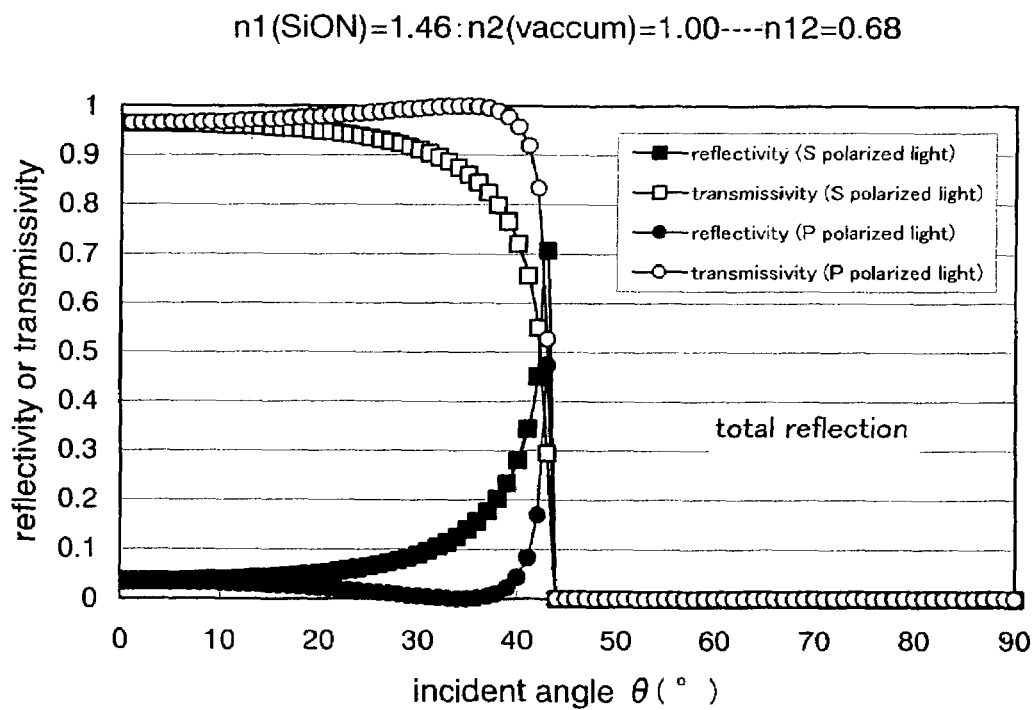
FIG. 2 shows a reflectance and a transmittance to an incident angle θ of light incident into an interface between a silicon oxide and a vacuum.
Figure 3:
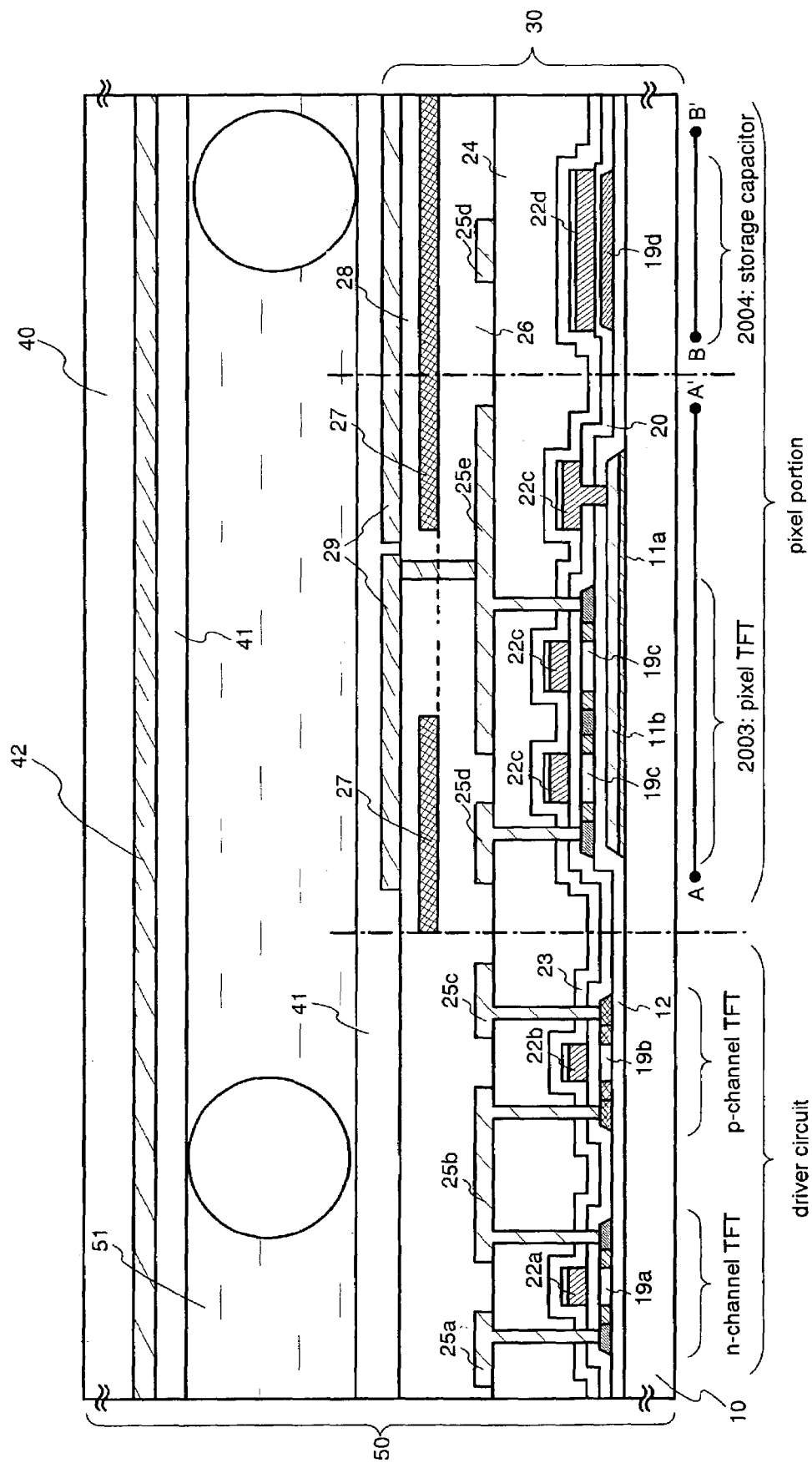
FIG. 3 is a sectional view of a portion of a liquid crystal display device.

In this embodiment, a process of forming a TFT array substrate in which a lower light shielding film is provided under a semiconductor layer composing a TFT will be described using FIGS. 3 and 9. Even in the case where the lower light shielding film is provided under the semiconductor layer as in this embodiment, for example, when intense light such as light from a projector or the like is irradiated, there is the case where light irradiated between the lower light shielding film and the semiconductor layer wraps around to cause a light leak current. Even in this case, when the present invention is applied, the amount of reflection light on a substrate interface can be reduced and the amount of light leak current can be suppressed. Note that the liquid crystal display device in this embodiment is a TN type liquid crystal display device.

As a substrate 10, a quartz substrate, a glass substrate, a ceramic substrate, or the like is used. In addition, a silicon substrate, a metallic substrate, or a stainless substrate on the surface of which an insulating film is formed may be used. Note that, when a glass substrate is used, heat treatment may be conducted in advance at a temperature lower than a glass distortion point by 10° C. to 20° C.

A polysilicon film and a WSi film are formed on the substrate 10 and patterned to form lower light shielding films 11. As the lower light shielding film 11, a polysilicon film, a $WSi_x$ (x=2.0 to 2.8) film, a film made of a conductive material such as Al, Ta, W, Cr, or Mo, and a film having a laminate structure thereof can be used. In this embodiment, the lower light shielding films 11 have a laminate structure of a $WSi_x$ film (100 nm in film thickness) 11b and a polysilicon film (50 nm in film thickness) 11a, are made of a conductive material having a high light shielding property, and are formed at predetermined intervals. Note that the lower light shielding films 11 function as gate lines. Thus, hereinafter, portions corresponding to the lower light shielding films are called the gate lines.

A first insulating film 12 is formed so as to cover the gate lines 11. The first insulating film 12 has a film thickness of 500 nm. As the first insulating film 12, an insulating film containing silicon which is formed by a low pressure CVD method, a plasma CVD method, a sputtering method, or the like is used. In addition, the first insulating film 12 is preferably made from a silicon oxide film, a silicon oxynitride film, a silicon nitride film, or a laminate film in which these films are combined.

Next, an amorphous semiconductor film is formed on the first insulating film 12 by a low pressure CVD method. A material of the amorphous semiconductor film is not particularly limited. However, it is made of preferably, silicon or silicon germanium ($Si_xGe_{1-x}$: 0<x<1, typically, x=0.001 to 0.05) alloy or the like. Note that in this embodiment, an amorphous silicon film having a thickness of 65 nm is formed as the amorphous semiconductor film.

Next, the amorphous silicon film is crystallized by a crystallization step using Ni as a catalytic metallic element to form a crystalline silicon film. Note that, after the crystallization step, laser irradiation may be conducted for the crystalline silicon film to improve the crystallinity of the crystalline silicon film.

A mask insulating film made from a silicon oxide film having a film thickness of 50 nm is formed as a mask on the crystalline silicon film after the crystallization and then phosphorus is added to the crystalline silicon film at a concentration of $1\times10^{19}$ atoms/cm$^3$ to $1\times10^{20}$ atoms/cm$^3$. Thereafter, heat treatment is conducted at 700° C. for 12 hours to getter catalytic metallic elements which became unnecessary after the crystallization to regions to which phosphorus is added.

Next, in order to improve the crystallinity of the crystalline silicon film, oxidation treatment is conducted. When thermal oxidation treatment is conducted at 950° C. after a silicon oxide film (hereinafter referred to as an HTO film) having a thickness of 20 nm is formed on the crystalline silicon film by using a low pressure CVD apparatus, a thermal oxide film is formed at a ratio of HTO film to silicon oxide film (portion in which the silicon film is oxidized)=20:60 (nm). The thermal oxide film is etched, and then the crystalline silicon film whose thickness became 35 nm by the thermal oxidation treatment is patterned to form island-like semiconductor layers 19a to 19d having a desirable shape.

Next, an HTO film having a thickness of 30 nm is formed so as to cover the island-like semiconductor layers 19a to 19d. Then, phosphorus is added to the island-like semiconductor layer 19d in a region which becomes a storage capacitor 2004 later to impart conductivity so that it is used as the lower electrode of the storage capacitor. More Specifically, the HTO film having a thickness of 30 nm in a region located on the island-like semiconductor layer 19d is selectively etched, and then phosphorus is added to the island-like semiconductor layer 19d.

After that, an HTO film having a thickness of 50 nm is formed on the HTO film having a thickness of 30 nm to form a gate insulating film (second insulating film) 20 composed of the two HTO layers.

After the formation of the semiconductor layers 19a to 19d, a small amount of impurity element (boron or phosphorus) may be doped to control a threshold value of a TFT. This impurity adding step is preferably conducted before the semiconductor film crystallizing step, after the semiconductor film crystallizing step, or after the step of forming the gate insulating film 20.

Next, in order to form TFTs using the island-like semiconductor layers 19a to 19d as active layers, an impurity element for imparting an n-type or a p-type (hereinafter referred to as an n-type impurity element or a p-type impurity element) is selectively added to the semiconductor layers to form source regions and drain regions which have a low resistance, and to further form LDD regions. An impurity element is added to the LDD regions as in the source regions and the drain regions.

Thus, channel formation regions sandwiched between the source regions and the drain regions are formed in the island-like semiconductor layers 19a to 19d.

Thereafter, contact holes which reach the gate lines 11 through the first insulating film 12 and the gate insulating film 20 are formed. Then, a conductive film is formed on the gate insulating film 20 and patterned to form gate electrodes 22a to 22c and a capacitor wiring (upper electrode of the storage capacitor) 22d over the channel formation regions of the respective pixels. The gate insulating film 20 in a region in which the capacitor wiring 22d is formed is only the second layer of the gate insulating film. Thus, the region is thinner than other regions so that a retaining capacitance is increased. In addition, the gate electrode 22c is electrically connected with the gate wiring 11 through the contact hole.

The conductive film for forming the gate electrodes and the capacitor wiring is formed at a film thickness of about 300 nm from a polysilicon film to which an impurity element for imparting a conductivity type is added, a $WSi_x$ film (x=2.0 to 2.8), a film made of a conductive material such as Al, Ta, W, Cr, or Mo, or a film having a laminate structure thereof. It may be formed from a single layer made of the above conductive material.

Next, a third insulating film (first interlayer insulating film) 23 which covers the gate electrodes 22a to 22c and the capacitor wiring 22d is formed. The third insulating film 23 is preferably formed at a thickness of about 70 nm from a silicon oxide film, a silicon nitride film, a silicon oxynitride film, or a laminate film in which these films are combined.

Next, a fourth insulating film (second interlayer insulating film) 24 is formed. The fourth insulating film is formed at a thickness of about 800 nm from an organic insulator material film, a silicon oxide film, a silicon nitride film, or a silicon oxynitride-film.

Next, contact holes which reach the island-like semiconductor layers 19 through the gate insulating film 20, the third insulating film 23, and the fourth insulating film 24 are formed. Then, a conductive film which is in contact with the island-like semiconductor layers 19 through the contact holes is formed on the fourth insulating film 24 and patterned in a desirable shape to form connection wirings and source wirings 25a to 25e for electrical connection among respective TFTs. The conductive film for forming these wirings is obtained by forming a film containing mainly Al, W, Ti, or TiN or a conductive film having a laminate structure thereof (in this embodiment, a three-layer structure in which an Al film containing Ti is sandwiched by Ti films) such that its thickness becomes 500 nm, and then patterned. Note that the source wiring 25d is extended over the storage capacitor and electrically connected with the island-like semiconductor layer 19c.

Next, a fifth insulating film 26 covering the connection wirings is formed at a thickness of 1000 nm from an organic insulating film made of an acrylic or the like. A film which is made of Al, Ti, W, Cr, a black resin, or the like and has a high light shielding property is formed on the fifth insulating film 26 and patterned in a desirable pattern to form an upper light shielding film 27. The light shielding film 27 is located in a mesh shape so as to light-shield a region except the opening portions of pixels. Further, a sixth insulating film 28 made of the same material as the fifth insulating film 26 is formed so as to cover the light shielding film 27, and a contact hole which reaches the connection wiring 25e is formed in the fifth insulating film 26 and the sixth insulating film 28.

Next, a transparent conductive film made of an ITO or the like is formed at a thickness of 100 nm and patterned in a desirable shape to form a pixel electrode 29.

Figure 9:
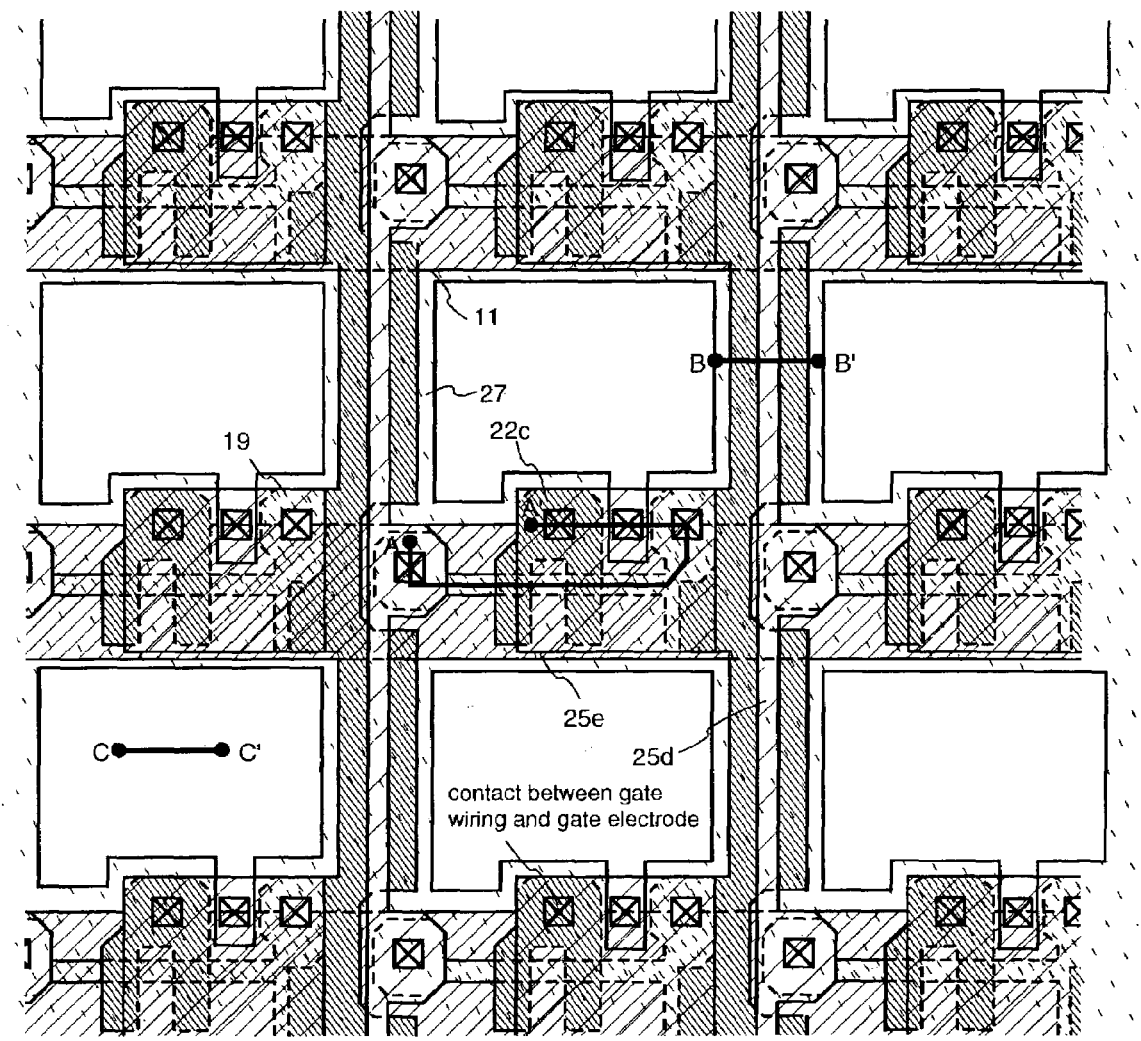
FIG. 9 is a top view of the entire liquid crystal display device.

FIG. 9 is a top view showing a formation state up to here. A substantially cross sectional view along an A-A' line in the drawing corresponds to an A-A' line portion in FIG. 3 and a substantially cross sectional view along a B-B' line corresponds to a B-B' line portion in FIG. 3. Note that the pixel electrode is not shown in FIG. 9.

Next, an alignment film 41 is formed in a TFT formation side of a TFT array substrate 30 and in a counter electrode 42 forming side of a counter substrate 40, respectively. An offset printing method is used for forming the alignment films 41. A polyimide resin is used as a material of the alignment films 41. In addition to this, a polyamic-based resin or the like may be used.

A polarizing plate 62 is attached to the counter substrate 40 such that polarized light in the same director direction as liquid crystal molecule in the liquid crystal layer which is closest to the counter substrate 40 is incident thereto. In addition, a polarizing plate 60 is attached to the TFT array substrate 10 such that light in the same director direction as liquid crystal molecule in the liquid crystal layer which is closest to the TFT array substrate 10 is outputted.

Rubbing treatment is conducted in an alignment film formation side of the TFT array substrate and that of the counter substrate so that liquid crystal molecules are aligned at a constant pretilt angle. A rubbing angle is set such that the liquid crystal molecules have a twist angle of 90° and a director direction of liquid crystal molecules in the liquid crystal layer which are closest to the TFT array substrate crosses a line C-C' in FIG. 9 at 45°. In this embodiment, the twist angle is set to 90°. However, an angle other than this angle may be set to obtain a desirable contrast and the like. In addition, in order to convert light transmitted through the liquid crystal layer into mainly polarized light perpendicular to the line C-C' in FIG. 9 at a voltage in which a change in transmittance of light transmitting through the substrate becomes maximum with respect to a change in voltage applied to the liquid crystal layer, the director direction of the liquid crystal molecules must be changed if necessary. After the rubbing treatment, the TFT array substrate 30 and the counter substrate 40 are washed to remove contamination caused by the rubbing treatment and fallen wool of a rubbing cloth. Thus, light including mainly p-polarized light is made incident into a pixel TFT 2003.

A sealing agent (not shown) is applied to the counter substrate, and then the counter substrate 40 is heated in an oven for provisional curing of the sealing agent. After the provisional curing, spacers of plastic spheres are sprayed in the pixel electrode formation side of the counter substrate.

The TFT formation side of the TFT array substrate 30 and the counter electrode 42 formation side of the counter substrate 40 are opposed to each other and both substrates are bonded to each other with high precision to manufacture a liquid crystal panel 50. Fillers (not shown) are mixed into the sealing agent. Thus, both substrates can be bonded to each other at a constant interval by the fillers and the spacers.

An unnecessary portion of the bonded substrates is sheared to obtain the liquid crystal panel 50 substrate having a desirable size.

A liquid crystal material 51 is injected into the inner portion of the liquid crystal panel 50. After the entire inner portion of the panel is filled with the liquid crystal material 51, the panel is completely sealed with a sealing agent (not shown).

As in Embodiment 1, in the liquid crystal panel 50, a scan signal driver circuit and an image signal driver circuit are provided in the vicinity of a pixel portion. In addition to these, a signal processing circuit including a CPU and a memory may be provided. The driver circuits are connected with an external input and output terminal group through a connection wiring group.

In the pixel portion, gate wiring groups extended from the scan signal driver circuit cross data wiring groups extended from the image signal driver circuit in matrix to construct pixels. A pixel TFT, a storage capacitor, and a pixel electrode are provided for each of the pixels.

A sealing agent is formed outside the pixel portion, the scan signal driver circuit, the image signal driver circuit, and the signal processing circuit on the TFT array substrate 30 and in the inner portion of the external input and output terminal.

In the outside of the liquid crystal panel 50, a flexible printed circuit (FPC) is connected with the external input and output terminal so that it is connected with the respective driver circuits through the connection wiring group. The external input and output terminal is made from the same conductive film as the data wiring group. The flexible printed circuit is composed of an organic resin film made of a polyimide or the like to which copper wirings are formed, and connected with the external input and output terminal by an anisotropic conductive adhesive.

Embodiment 4

Figure 10A:
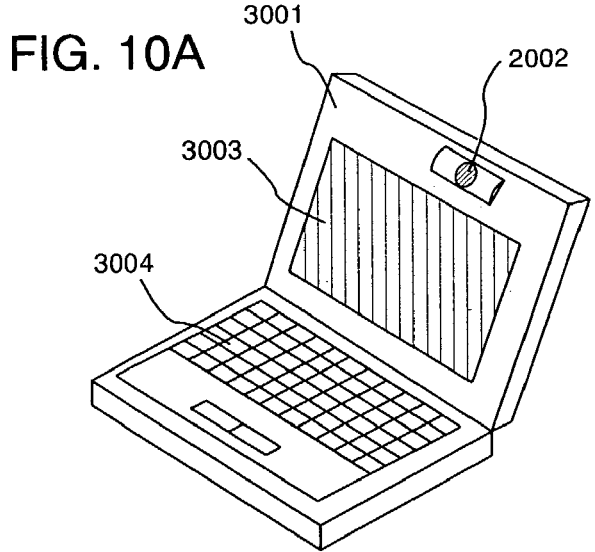
FIGS. 10A to 10D show examples of electronic equipment to which a display device of the present invention is applied.
Figure 10B:
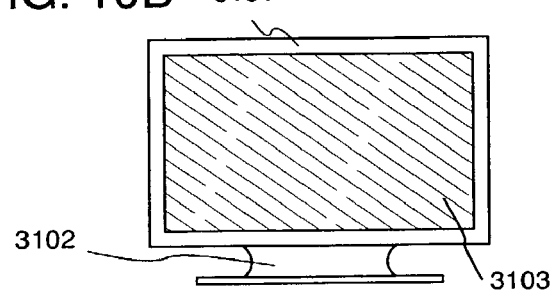
Figure 10C:
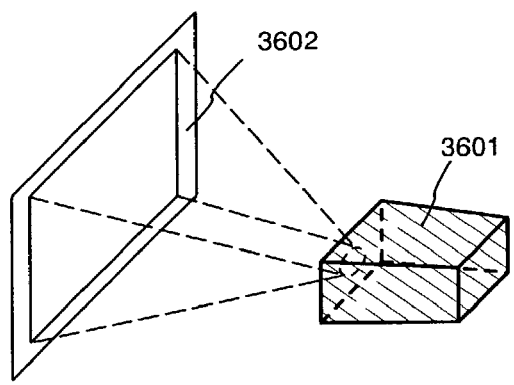
Figure 10D:
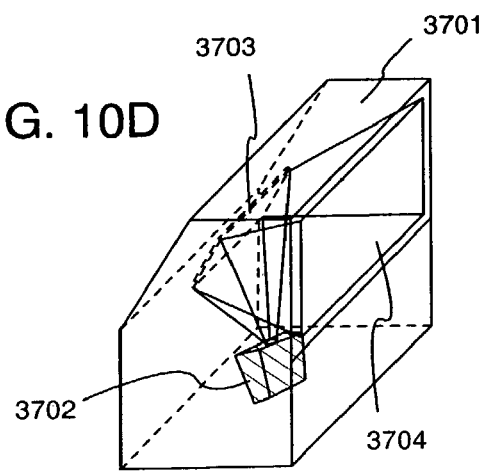

With respect to specific examples of electrical appliances provided with a display device to which the present invention is applied as a display unit, as shown in FIGS. 10A to 10D, there are a personal computer (FIG. 10A), a display (FIG. 10B), a front type projector (FIG. 10C), and another front type projector (FIG. 10D). An electronic device of the present invention can be used as the display unit of the electrical appliance. In addition, the electronic device can be used as a display unit of an electronic device except the above mentioned electrical appliances. According to electronic equipment provided with the display device to which the present invention is applied, the amount of light leak current is suppressed to reduce color ununiformity of a display image and error display so that a preferable display image is obtained.

According to the present invention, the amount of light which is reflected on an interface with the TFT array substrate and wraps around the pixel TFT can be reduced so that the amount of light leak current can be suppressed.

What is claimed is:

1. A liquid crystal display device comprising:
a pair of substrates; and
a liquid crystal layer provided between the pair of substrates, wherein one of the pair of substrates comprises:
a pixel region including a thin film transistor and a light shielding layer, the light shielding layer having an opening portion for transmitting light and comprising at least one layer, and the thin film transistor comprising a semiconductor layer which is overlapped with the light shielding layer and formed along one side of the opening portion,
an interlayer insulating film formed over the thin film transistor;
a source wiring electrically connected to the semiconductor layer through a wiring which is formed on the interlayer insulating film; and
a gate wiring formed on the interlayer insulating film,
wherein, when a change in transmittance of light which transmits through the pair of substrates becomes maximum with respect to a change in voltage applied to the liquid crystal layer, an alignment of a liquid crystal molecule in the liquid crystal layer is controlled such that light which transmits through the liquid crystal layer and is incident into the one of the pair of substrates is incident as polarized light perpendicular to the one side of the opening portion.

2. A liquid crystal display device according to claim 1, wherein the liquid crystal display device is incorporated in at least one selected from the group consisting of a personal computer, a display and a projector.

3. A liquid crystal display device comprising:
a pair of substrates; and
a TN mode liquid crystal layer provided between the pair of substrates, wherein one of the pair of substrates comprises:
a pixel region including a thin film transistor and a light shielding layer, the light shielding layer having an opening portion for transmitting light and comprising at least one layer, and the thin film transistor comprising a semiconductor layer which is overlapped with the light shielding layer and formed along one side of the opening portion,
an interlayer insulating film formed over the thin film transistor;
a source wiring electrically connected to the semiconductor layer through a wiring which is formed on the interlayer insulating film; and
a gate wiring formed on the interlayer insulating film,
wherein the light shielding layer is provided under the thin film transistor, and
wherein, when a change in transmittance of light which transmits through the pair of substrates becomes maximum with respect to a change in voltage applied to the TN mode liquid crystal layer, an alignment of a liquid crystal molecule in the TN mode liquid crystal layer is controlled such that light which transmits though the TN mode liquid crystal layer and is incident into the one of the pair of substrates is incident as polarized light perpendicular to the one side of the opening portion.

4. A liquid crystal display device according to claim 3, wherein the liquid crystal display device is incorporated in at least one selected from the group consisting of a personal computer, a display and a projector.

5. A liquid crystal display device comprising:
a pair of substrates;
a pair of alignment films;
a TN mode liquid crystal layer provided between the pair of substrates, wherein one of the pair of substrates comprises:
a pixel region including a thin film transistor and a light shielding layer, the light shielding layer having an opening portion for transmitting light and comprising at least one layer, and the thin film transistor comprising a semiconductor layer which is overlapped with the light shielding layer and formed along one side of the opening portion,
an interlayer insulating film formed over the thin film transistor;
a source wiring electrically connected to the semiconductor layer through a wiring which is formed on the interlayer insulating film; and
a gate wiring formed on the interlayer insulating film,
wherein a rubbing treatment is conducted to the pair of alignment films so that when a change in transmittance of light which transmits though the pair of substrates becomes maximum with respect to a change in voltage applied to the TN mode liquid crystal layer, a polarization of light which transmitted through the TN mode liquid crystal layer and is incident into the opening portion is perpendicular to the one side of the opening portion.

6. A liquid crystal display device according to claim 5, wherein the liquid crystal display device is incorporated in at least one selected from the group consisting of a personal computer, a display and a projector.

7. A liquid crystal display device comprising:
a pair of substrates;
a liquid crystal layer provided between the pair of substrates, wherein one of the pair of substrates comprises:
a pixel region including a thin film transistor comprising a semiconductor layer; and
a plurality of light shielding layers;
an interlayer insulating film formed over the thin film transistor;
a source wiring electrically connected to the semiconductor layer through a wiring which is formed on the interlayer insulating film; and
a gate wiring formed on the interlayer insulating film,
wherein at least one of the plurality of light shielding layers has an opening portion for transmitting light,
wherein the thin film transistor is overlapped with at least one of the plurality of light shielding layers and formed along one side of the opening portion, and
wherein, when a change in transmittance of light which transmits though the pair of substrates becomes maximum with respect to a change in voltage applied to the liquid crystal layer, a polarization of light which transmitted through the liquid crystal layer and is incident into the opening portion is perpendicular to the one side of the opening portion.

8. A liquid crystal display device according to claim 7, wherein the liquid crystal display device is incorporated in at least one selected from the group consisting of a personal computer, a display and a projector.

9. A liquid crystal display device according to claim 7, wherein one of the plurality of light shielding layers is electrically connected to a gate electrode of the thin film transistor.

10. A liquid crystal display device comprising:
a pair of substrates; and
a TN mode liquid crystal layer provided between the pair of substrates, wherein one of the pair of substrates comprises:
a pixel region including a thin film transistor comprising a semiconductor layer; and
a plurality of light shielding layers;
an interlayer insulating film formed over the thin film transistor;
a source wiring electrically connected to the semiconductor layer through a wiring which is formed on the interlayer insulating film; and
a gate wiring formed on the interlayer insulating film,
wherein at least one of the plurality of light shielding layers has an opening portion for transmitting light,
wherein the thin film transistor is overlapped with at least one of the plurality of light shielding layers and formed along one side of the opening portion,
wherein one of the plurality of light shielding layers is provided under the thin film transistor, and
wherein, when a change in transmittance of light which transmits though the pair of substrates becomes maximum with respect to a change in voltage applied to the TN mode liquid crystal layer, a polarization of light which transmitted through the TN mode liquid crystal layer and is incident into the opening portion is perpendicular to the one side of the opening portion.

11. A liquid crystal display device according to claim 10, wherein the liquid crystal display device is incorporated in at least one selected from the group consisting of a personal computer, a display and a projector.

12. A liquid crystal display device according to claim 10, wherein one of the plurality of light shielding layers is electrically connected to a gate electrode of the thin film transistor.

13. A liquid crystal display device comprising:
a pair of substrates;
a pair of alignment films; and
a TN mode liquid crystal layer provided between the pair of substrates, wherein one of the pair of substrates comprises:
a pixel region including a thin film transistor comprising a semiconductor layer; and
a plurality of light shielding layers,
an interlayer insulating film formed over the thin film transistor;
a source wiring electrically connected to the semiconductor layer though a wiring which is formed on the interlayer insulating film; and
a gate wiring formed on the interlayer insulating film,
wherein at least one of the plurality of light shielding layers has an opening portion for transmitting light,
wherein the thin film transistor is overlapped with at least one of the plurality of light shielding layers and formed along one side of the opening portion, and
wherein a rubbing treatment is conducted to the pair of alignment films so that when a change in transmittance of light which transmits through the pair of substrates becomes maximum with respect to a change in voltage applied to the TN mode liquid crystal layer, a polarization of light which transmitted through the TN mode liquid crystal layer and is incident into the opening portion is perpendicular to the one side of the opening portion.

14. A liquid crystal display device according to claim 13, wherein the liquid crystal display device is incorporated in at least one selected from the group consisting of a personal computer, a display and a projector.

15. A liquid crystal display device according to claim 13, wherein one of the plurality of light shielding layers is electrically connected to a gate electrode of the thin film transistor.

* * * * *